No. 720,329. PATENTED FEB. 10, 1903.
J. F. COOK.
APPARATUS FOR HOISTING OR LOWERING MATERIAL.
APPLICATION FILED NOV. 22, 1900.
NO MODEL. 4 SHEETS—SHEET 1.

Witnesses   Inventor
  James F. Cook
By his Attorneys

No. 720,329. PATENTED FEB. 10, 1903.
J. F. COOK.
APPARATUS FOR HOISTING OR LOWERING MATERIAL.
APPLICATION FILED NOV. 22, 1900.
NO MODEL. 4 SHEETS—SHEET 2.
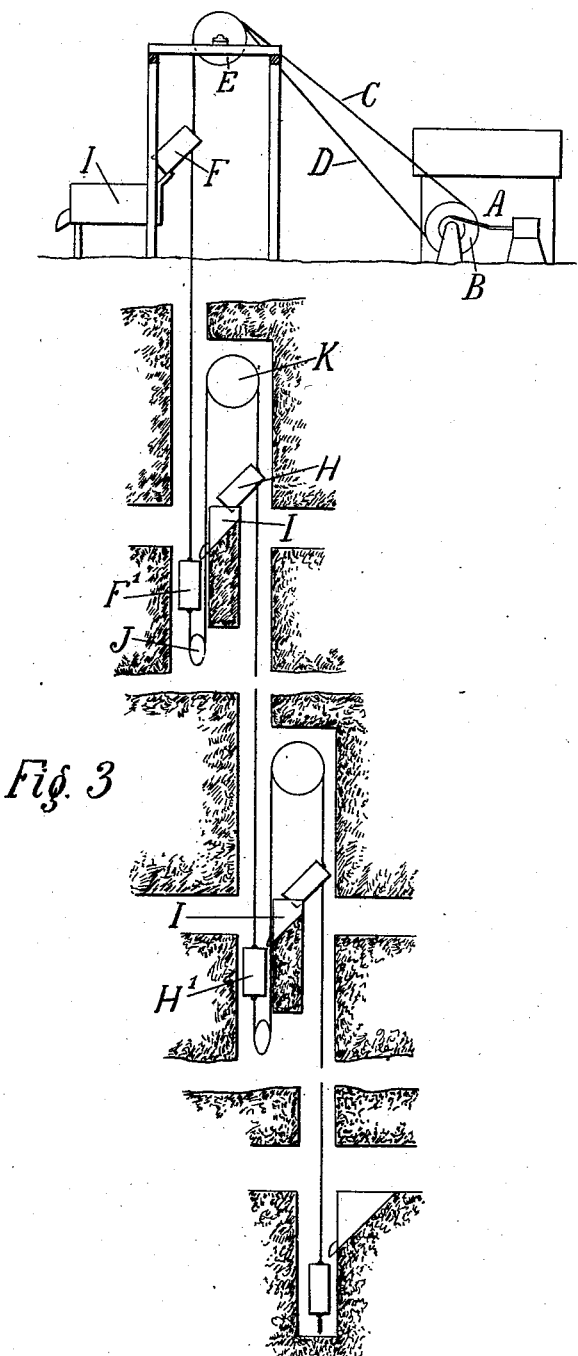
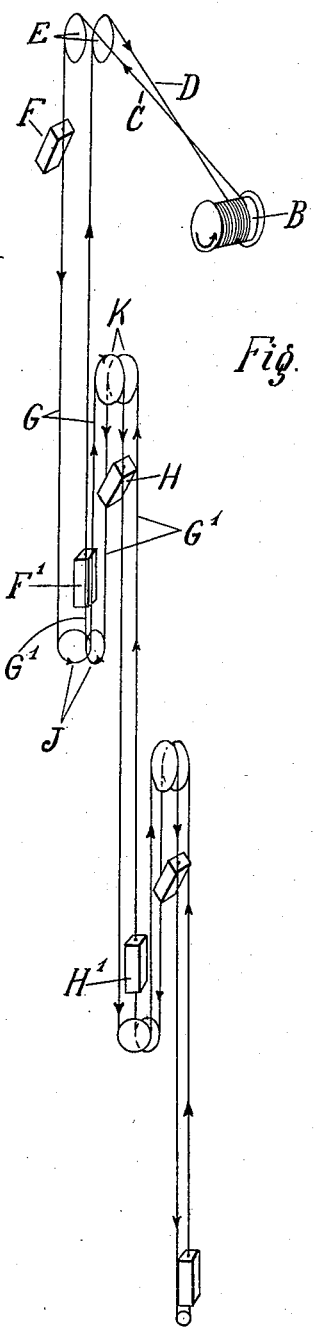

No. 720,329. PATENTED FEB. 10, 1903.
J. F. COOK.
APPARATUS FOR HOISTING OR LOWERING MATERIAL.
APPLICATION FILED NOV. 22, 1900.
NO MODEL. 4 SHEETS—SHEET 3.
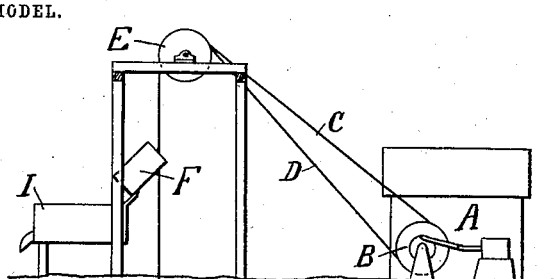
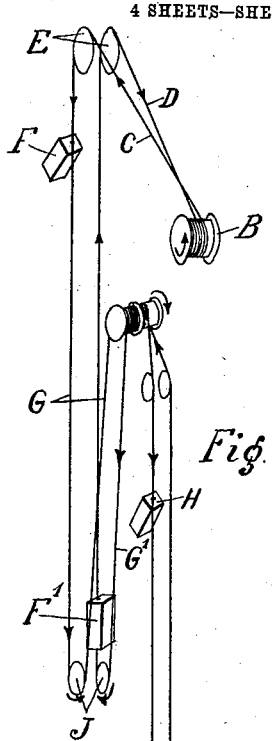

No. 720,329. PATENTED FEB. 10, 1903.
J. F. COOK.
APPARATUS FOR HOISTING OR LOWERING MATERIAL.
APPLICATION FILED NOV. 22, 1900.
NO MODEL. 4 SHEETS—SHEET 4.

UNITED STATES PATENT OFFICE.

JUNIUS FORD COOK, OF JOHANNESBURG, TRANSVAAL, SOUTH AFRICA.

APPARATUS FOR HOISTING OR LOWERING MATERIAL.

SPECIFICATION forming part of Letters Patent No. 720,329, dated February 10, 1903.

Application filed November 22, 1900. Serial No. 37,372. (No model.)

*To all whom it may concern:*

Be it known that I, JUNIUS FORD COOK, of Exploration Buildings, Johannesburg, Transvaal, South Africa, presently of Mansion House Buildings, Cape Town, Cape Colony, South Africa, have invented Apparatus for Raising or Lowering Material from a Lower to a Higher Level, or Vice Versa, in One or More Stages or Sections, which is fully set forth in the accompanying drawings.

The object of my invention is to produce an improved device used for hoisting ore or substances from mines or shafts.

Figures 1, 2:
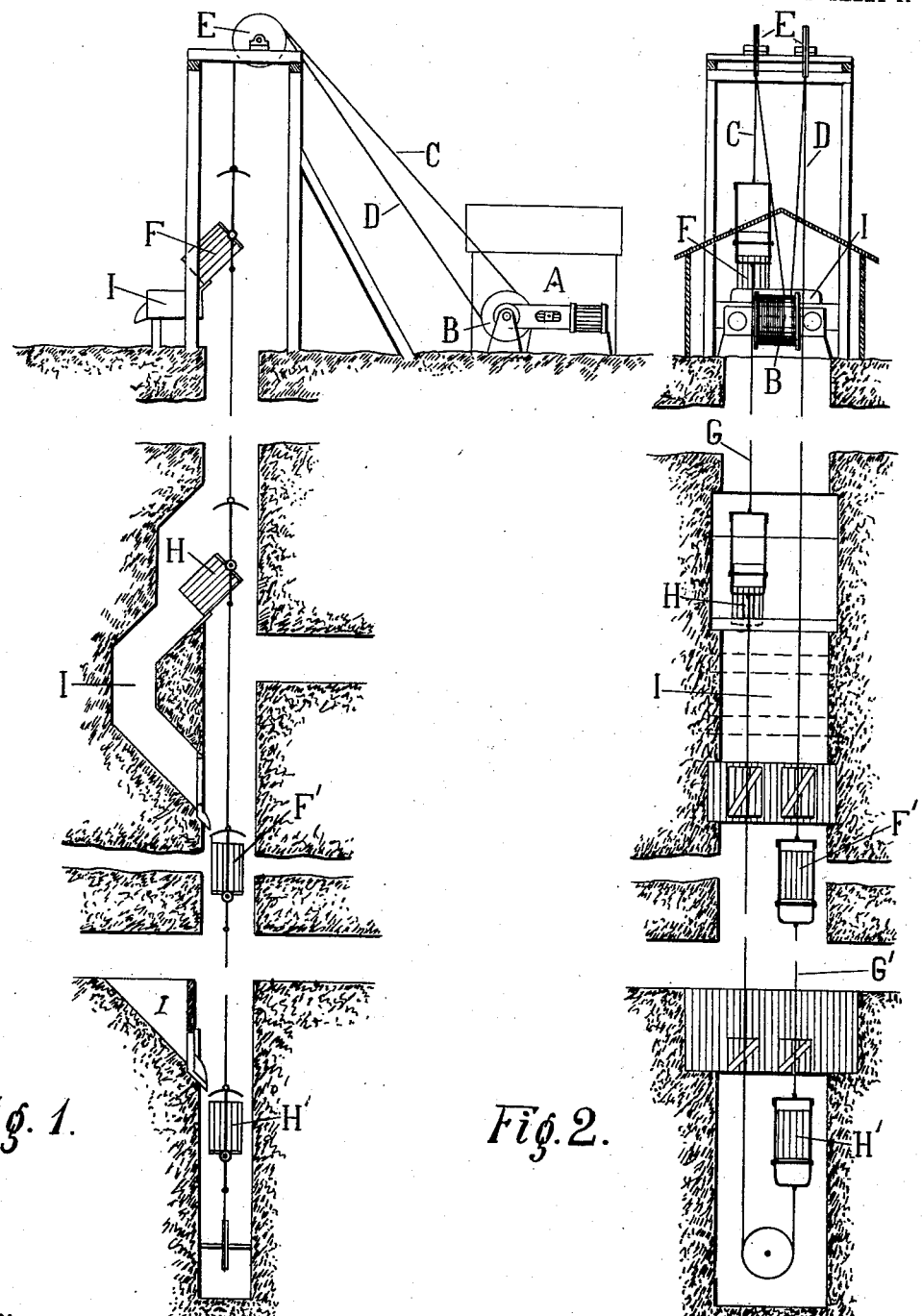

In the drawings forming part of this specification, Figure 1 is a section of my improved invention in use in a shaft. Fig. 2 is another view of the same, taken at right angles to the first. Fig. 3 is a view showing the invention modified for a shaft which has offsets. Fig. 4 is a view in perspective, showing the arrangement of ropes and tail-ropes for the device shown in Fig. 3. Fig. 5 shows a further modification of my invention. Fig. 6 is a perspective view showing the arrangement of ropes for the form of device shown in Fig. 5. Figs. 7, 8, 9, and 10 are views showing the constructions of the winding-drums.

Referring to Figs. 1 and 2, A represents the hoisting-engine, which may be of any type, having a drum B, around which are placed the hoisting-ropes C and D in any desired manner. These hoisting-ropes pass over a pulley E above the shaft, as illustrated in Figs. 1 and 2. Two sets of cars or skips are used. The hoisting-rope C is attached to the car or skip F, the hoisting-rope D to the car or skip F', so that if one car or skip is raised the other is lowered. Attached to these cars are the tail-ropes G and G'. These tail-ropes are in turn attached to cars H and H', as many sets of skips or cars being provided as is necessary for the depth of shaft. These cars or skips may be of any construction that is desired. At the limit of the upward hoist of each set of skips or cars is constructed a bin I, so arranged that the skip or car of the lower set when at its topmost position will dump its load into the skip or car of the next set above at its lowermost position. I may construct these bins in any desired manner, and the mode of operation is clearly shown in Fig. 1. The result of this construction is that as the engine works the car or skip is alternately hoisted and lowered. The car or skip starting from the bottom of the shaft—as, for instance, the car shown at the bottom in Fig. 1—rises to the height of the entrance to the bin next above it. There it discharges its load into the car or skip of the next section, which is at its lowermost position. This car or skip on rising transfers the load one stage higher, and so on until the top of the shaft is reached. It will be observed, therefore, that the hoist of the engine is no more than is necessary to raise the load from the first bin below the surface, and no matter how deep the mine or shaft the operation of the engine with this short hoist will raise the load to the surface continuously. The saving in time, amount of rope, size of drums, and machinery necessary is obviously very great and the economy of the device far superior to any heretofore devised. The same construction of hoisting-engine, cars and skips, drums, &c., as are used with the devices heretofore used are employed in the operation of my device.

In Figs. 3 and 4 is shown a somewhat-modified form of the device which is intended to be used in those shafts which do not proceed in a straight line, but are offset. It differs from the construction shown in Figs. 1 and 2 in that the top rope is passed over the pulley J at the lower end of a section of the shaft and then over a pulley K at the top of the next section of shaft in order to get a direct hoist in each case. Fig. 4 shows in a perspective diagram the method of hoisting, the arrows indicating the directions in which the ropes travel.

Figure 7:
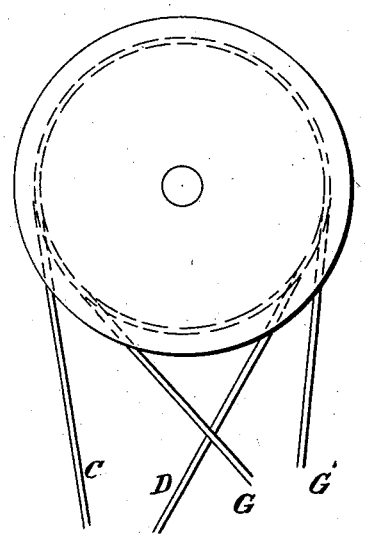
Figure 8:
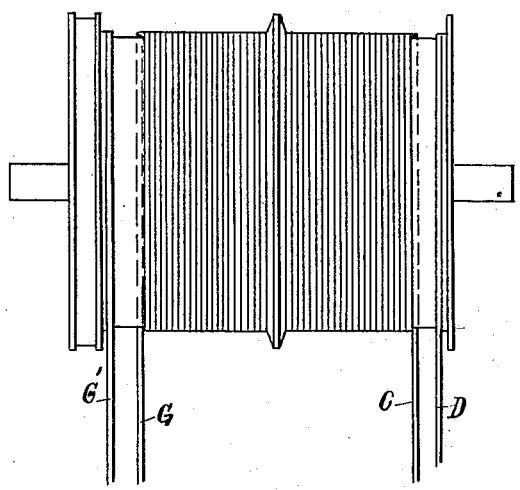

In Figs. 5 and 6 is shown still another modification in which the tail-rope of one car is attached to a regular winding-drum, so that the motion of the car or skip operates the winding-drum, and thus operates to raise or lower the cars or skips of the next lower section. Fig. 6 shows diagrammatically and in perspective the method of operation. In Figs. 7 and 8 is shown one of such drums, the hoisting-ropes being indicated by the letters C and D and the tail-ropes by the letters G and G'.

Figure 9:
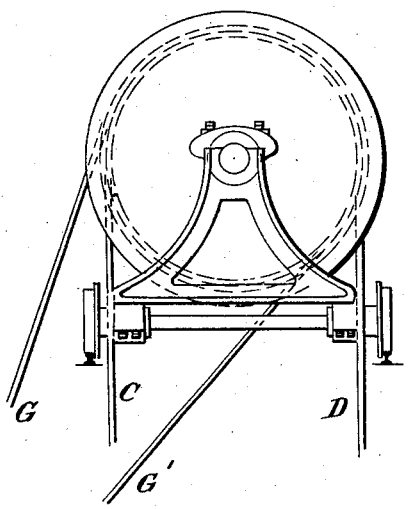
Figure 10:
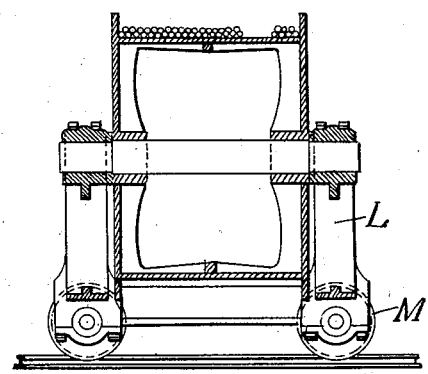

In Figs. 9 and 10 are shown modified forms, the drum being mounted on a framework L, which in turn has rollers or wheels M, and this, if properly mounted, allows the sheave to travel in a direction which will bring the rope always vertically upward from the car.

In Fig. 10 is also shown a method of winding the ropes in order to use a drum of less length than that shown in Fig. 8. In this case the tail-rope of one car is wound on the drum directly over the hoisting-rope of the skip or car next below, so that both wind and unwind together. This is clearly indicated in the drawings.

What I claim, and desire to secure by Letters Patent, is—

1. In a hoisting device, the combination of a hoisting-engine, a drum, hoisting-ropes on said drum, skips or cars attached to said hoisting-ropes, tail-ropes attached to said skips or cars, other skips or cars attached to said tail-ropes, whereby the tail-rope attached to one car acts as the hoisting-rope for another car, substantially as described.

2. In a hoisting device the combination of the hoisting-engine and its hoisting-ropes, a series of skips or cars attached to said hoisting-ropes, tail-ropes attached to said skips or cars, another series of skips or cars, and connections whereby the tail-rope attached to a car of one series acts as the hoisting-rope for one of another series, substantially as described.

3. The combination of a hoisting-engine and its hoisting-ropes, a series of cars attached to said hoisting-ropes, tail-ropes attached to said cars, other cars attached to said tail-ropes, and means whereby the contents of the car of one series may be transferred to a car of the next, substantially as described.

4. The combination of a hoisting-engine, series of cars actuated thereby, means to receive the load of a car at its highest point and transfer the same to the car of the next series when at its lowest point, substantially as described.

5. In a hoisting device the combination of the hoisting-engine, the hoisting-ropes, skips or cars attached to said ropes, tail-ropes attached to said skips or cars, other skips or cars attached to said tail-ropes whereby the tail-rope attached to one car acts as the hoisting-rope for another car, and means to receive the load of a car at its highest point and transfer the same to a car of the next series when at its lowest point, substantially as described.

In witness whereof I have hereunto set my hand in presence of two witnesses.

JUNIUS FORD COOK.

Witnesses:
H. R. ARLENER,
CHAS. F. BROWN.